United States Patent [19]

Greaby et al.

[11] Patent Number: 4,758,822
[45] Date of Patent: Jul. 19, 1988

[54] BIDIRECTIONAL AMPLIFIER

[75] Inventors: Robert D. Greaby, Seattle, Wash.; Hugh S. Montgomery, Huntsville, Ala.

[73] Assignee: GTE Communication Systems Corporation, Phoenix, Ariz.

[21] Appl. No.: 857,889

[22] Filed: Apr. 30, 1986

[51] Int. Cl.$^4$ ............................................. H04B 1/58
[52] U.S. Cl. ................................. 340/425; 379/345
[58] Field of Search ............. 379/344, 345, 402, 403, 379/405, 394, 395, 382, 399, 398, 391, 400, 392, 342, 338; 340/425

[56] References Cited

U.S. PATENT DOCUMENTS

| | | | |
|---|---|---|---|
| 2,496,266 | 2/1950 | Brode et al. | 379/344 |
| 3,711,660 | 1/1973 | Cherry | 379/403 |
| 3,855,431 | 12/1974 | Stewart | 379/344 X |
| 3,934,099 | 1/1976 | Elder, Jr. | 379/405 |
| 4,163,878 | 8/1979 | Hashemi | 379/345 X |
| 4,358,643 | 11/1982 | Levy | 379/402 |

OTHER PUBLICATIONS

"Electronic Instrumentation and Measurement Techniques", W. Cooper, Prentice-Hall, Inc., New Jersey, 1978, pp. 179-197.

Primary Examiner—Jin F. Ng
Assistant Examiner—R. Vaas
Attorney, Agent, or Firm—Robert J. Black; Charles A. Doktycz

[57] ABSTRACT

A bidirectional amplifier for use in a transmission line, that utilizes a pair of interconnected bridge circuits including isolation transformers and a pair of unidirectional amplifiers. The transmission in each direction uses a single amplifier to amplify the signal for a particular direction of transmission without effecting the other amplifier.

1 Claim, 1 Drawing Sheet

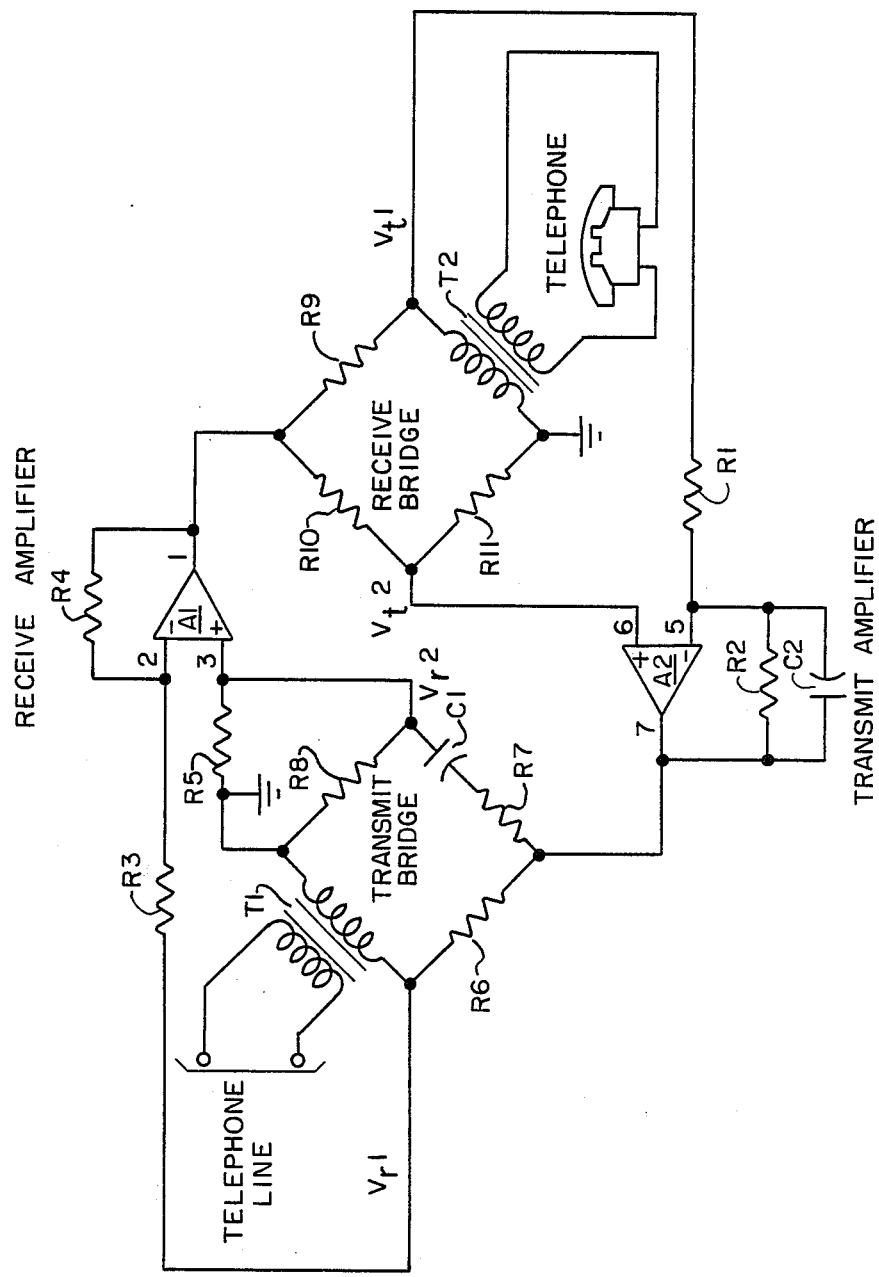

BIDIRECTIONAL AMPLIFIER

FIELD OF THE INVENTION

This invention relates to telephone systems and more particularly to an amplifier for insertion in the transmission path between a subscriber station and a central switching exchange.

BACKGROUND OF THE INVENTION

In conventional telephone switching systems the subscribers are interconnected by the metal contacts of the switching grid. However, the replacement of these metal contacts by electronic switches, present new problems. In particular, these switches have a higher resultant resistance than the corresponding metal contacts, which they are replacing.

In a conventional telephone set the energy imparted to the microphone by the voice of the user is applied to a hybrid transformer which transfers part thereof to the telephone line itself and the remaining part to a balancing circuit. When the impedance of this balancing circuit exactly matches that of the line, part of the energy will be transferred to the telephone receiver; this is referred to as the side tone effect. Although this transfer is necessary, it should not exceed a suitable level because, as is well known, the higher the intensity of the acoustic energy being transferred, to the speakers ear the more softly the user will tend to speak. In order to keep this effect within reasonable limits, the characteristics of the balancing circuit are selected as a function of the impedance of the line to which the telephone set is connected. Since conventional telephone sets are generally designed to be connected to common-carrier lines and central offices or exchanges, the impedance of the balancing circuit incorporated therein is made to match that of said lines and central offices; this circuit usually consists of a resistance-capacitance network.

When a telephone set incorporating such a circuit is used in a private automatic branch exchange (PABX), the switching network of the PABX must be perfectly "transparent" if the circuit is to correctly perform its intended function. In providing satisfactory transmission characteristics to signal transmission through two wire transmission lines, it is often necessary to introduce means for compensating the available signal levels.

A circuit generally referred to as a 22-type phone line repeater is used to provide transmission level compensation. Due to application differences, the circuit structures are different. A line repeater requires complex adjustable networks to achieve proper balance whereas this circuit uses a bridge with fixed component values. The bidirectional amplifier mirrors impedance changes from one side to the other side and therefore is transparent to the phone and the phone line. A 22-type line repeater would have adjustable networks to compensate for line impedance changes.

SUMMARY OF THE INVENTION

Accordingly, there is disclosed an amplifier circuit through which voice transmission can occur simultaneously in both directions. That is, the circuit acts as an amplifier in both the transmit and receive directions. The amplifier thus compensates for signal losses in both the station apparatus and the switching network matrices.

The structure of the bidirectional amplifier consists of two amplifiers and two bridge circuits. The circuit is almost symmetrical in structure for both the transmit and receive sections. Slight differences in each half arise from different transmit and receive gains, matching to different impedances on each side and stability considerations.

BRIEF DESCRIPTION OF THE DRAWING

The principles of the invention will be better understood from a consideration of the detailed description of the one illustrative embodiment thereof when taken in conjunction with its accompanying schematic drawing.

DESCRIPTION OF THE PREFERRED EMBODIMENT

The circuit arrangement of the drawing shows in simplified schematic form an embodiment of the invention illustrating the major components. The circuit is adapted to couple signals between a two wire bidirectional telephone line and a subscriber station apparatus. The telephone line is coupled to the amplifier via an isolation transformer T1, with the station apparatus coupled to the amplifier via another isolation transformer T2.

The structure basically consists of two bridge circuitry and two amplifiers. The first or transmit bridge circuit includes a winding of transformer T1 and resistors R6, R8 and resistor R7 with capacitor C1. The second or receive bridge circuit includes a winding of transformer T2 and resistors R9, R10, and R11.

When a phone is transmitting, the voice signal unbalances the receive bridge at node Vt1; connected via resistor R1 to the negative input of amplifier A2. None of the signal can appear at node Vt2 of the recieve bridge due to the low impedance at the output of amplifier A1 connected to the junction resistors R9 and R 10. Amplifier A2 whose positive input is connected to node Vt2, provides enough gain to the phone's transmitted voice to compensate for voice level losses in the coupling transformers, the transmit bridge and various analog switohes whioh are not shown. The transmitted voice present at the output of amplifier A2 drives the transmit bridge at the junction of resistors R6 and R7 where some of the voice is coupled to the phone line via transformer T1. Amplifier A1 has its negative imput connected to the node Vr1. via resistor R3 and its positive imput to node Vr2 and also via—resistor R5 to—ground. Amplifier A1 acts as a difference amplifier to that portion of the drive signal that amplifier A2 puts out at node Vr1 and Vr2. The resistor components R7 and R8 are chosen such that in a perfectly balanced circuit only a small amount of signal appears back at the output of amplifier A1. Capacitor C1 prevents positive feedback from causing low frequency oscillations. In normal use, the phone line impedances vary with loop length and frequency. The phone is also changing impedance with frequency. Impedance changes in the phone line effect the null at the output of amplifier A1 such that line impedance changes are reflected back to the phone. The proper impedance being reflected back to the phone has a substantial effect on sidetone levels at the phone.

Received voice signals are amplified in the same manner as transmitted voice. Transformer T1 couples the voice signals in from the phone line to unbalance the transmit bridge at node Vr1. The received signals have no effect on transmitted signals due to superposition of received signals on the transmitted signals. Received signals at node Vr1 are amplified by amplifier A1 and applied to the receive bridge.

Transformers T2 couples some of the received signal to the phone. A portion of the received signal appears at node Vt1 and Vt2. Components R10 and R4 are chosen such that amplifier A2 will only return a small amount of received signal. While components R2 and C2 provide the proper balance for amplifier A2.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. In a bidirectional amplifier for insertion in a two wire line having a first two wire port for coupling to a first portion of said two wire line and a second two wire port for coupling to a second portion of said two wire line line comprising: a first and a second amplifier each having a first and a second input and an output, a transmit bridge including a first winding of a first line isolation transformer in one branch of said transmit bridge, and a second winding connected to said second portion of said two wire line, said first winding of said first transformer including a first and second terminal, said first terminal comprising a first node of said transmit bridge and connected via a first resistor to a first input of said first amplifier and via a second resistor to said output of said second amplifier, a third resistor and a first capacitor in series connecting said second amplifier output to said first amplifier second input, a fourth resistor completing said transmit bridge connected from said first transformer first winding to said first amplifier second input, a receive bridge including a first winding of a second line isolation transformer in one branch of said receive bridge, and a second winding connected to said first portion of said two wire line, said first winding of said second transformer including a first and second terminal, said second transformer first terminal comprising a first node of said receive bridge and connected via a fifth resistor to said first amplifier output and via a seventh resistor to said second amplifier first input, said second transformer first winding second terminal connected via a sixth resistor to said second input of said second amplifier, and an eighth resistor completing said receive bridge connected from said first amplifier output to said second amplifier second input; said bidirectional amplifier further including a ninth resistor connecting said first amplifier second input to ground, a tenth resistor connecting said first amplifier output to said first amplifier first input and a compensating network including an eleventh resistor and a capacitor in parallel, connected between the second input and the output of said second amplifier.

* * * * *